Dec. 1, 1964   G. L. BRIDGER ETAL   3,158,892
APPARATUS FOR APPLYING LIQUID TO TURF
Filed May 8, 1963   2 Sheets-Sheet 1
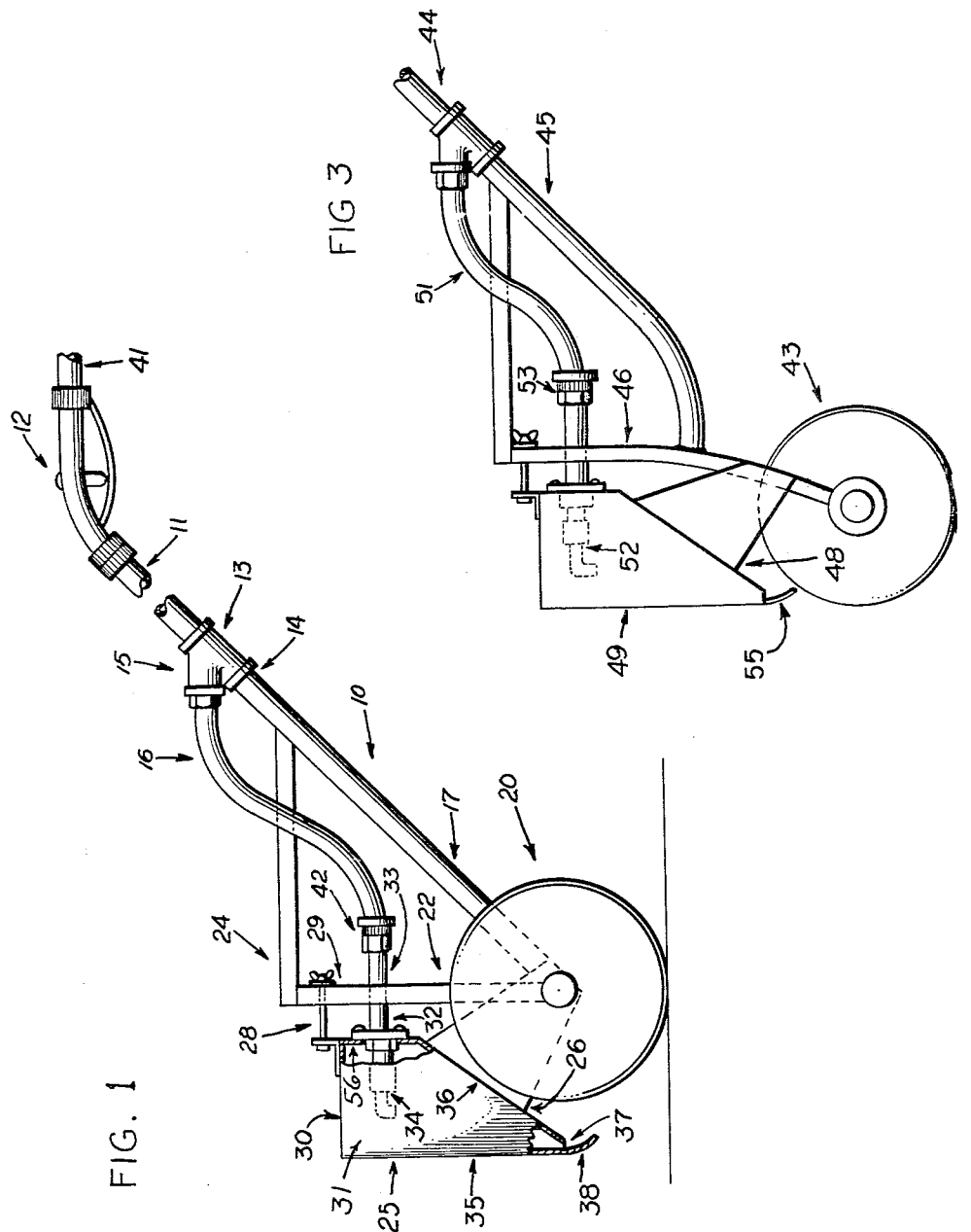
INVENTORS
Grover L. Bridger
Austin A. Zimmer
Henry P. Zerhusen
BY
Kenneth E. Prince ATTORNEY Dec. 1, 1964     G. L. BRIDGER ETAL     3,158,892
APPARATUS FOR APPLYING LIQUID TO TURF
Filed May 8, 1963     2 Sheets-Sheet 2
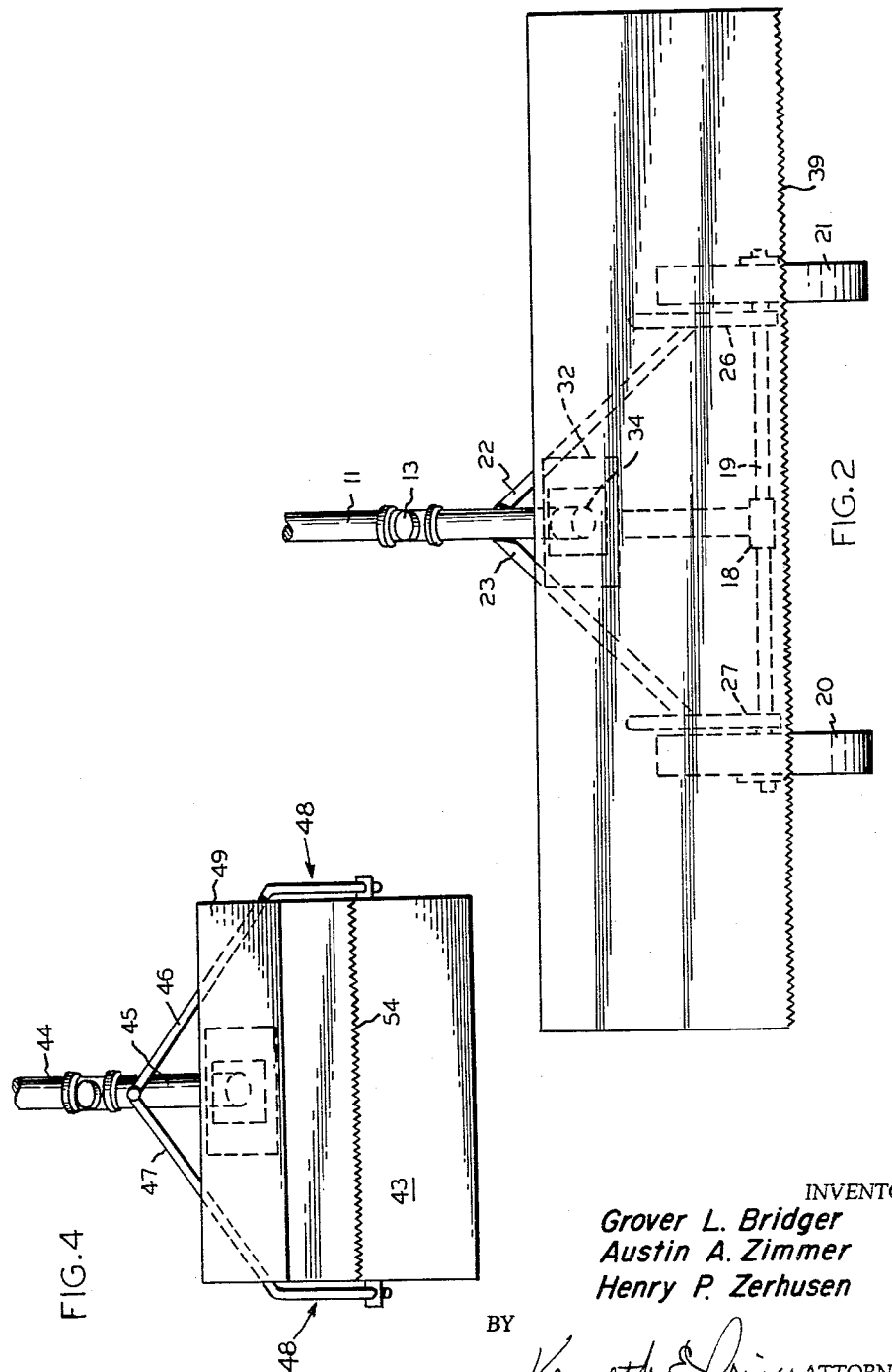
INVENTORS
Grover L. Bridger
Austin A. Zimmer
Henry P. Zerhusen
BY
Kenneth E. Prince ATTORNEY

United States Patent Office 3,158,892
Patented Dec. 1, 1964

3,158,892
APPARATUS FOR APPLYING LIQUID TO TURF
Grover L. Bridger, Austin A. Zimmer, and Henry P. Zerhusen, Baltimore, Md., assignors to W. R. Grace & Co., New York, N.Y., a corporation of Connecticut
Filed May 8, 1963, Ser. No. 278,940
2 Claims. (Cl. 15—575)

This invention relates to a device for applying fertilizers, pesticides, or weed killers to turf, and is particularly concerned with a device which permits the application of such materials to turf without endangering surrounding vegetation.

One of the serious difficulties which is encountered in the application of fertilizers, pesticides, and weed killers to turf is that these materials, to be effective, usually must be appiled to the turf in the form of slurries or solutions and that these solutions, to prevent too great concentrations on any one spot, must be finely atomized or sprayed onto the grasses. Since these materials, particularly weed killers, may be quite deadly to broad-leafed vegetation, it is necessary to apply them carefully and take great pains that none of the spray reaches surrounding vegetation.

In a dead calm, this can be accomplished, but even a light breeze makes the application of such materials to turf a hazard to valuable plants which may surround the grassed area, for minute droplets can be carried by the wind to considerable distances.

It is an object of this invention to produce an applicator device which will prevent any of the spray from being picked up and carried away by the wind. A further object is to produce a device which deposits a uniform amount of material over each unit area of treated turf. These and other objects will become apparent from the specification and from the drawings in which FIG. 1 is a side elevation of one form of the device.
FIG. 2 shows the device in front elevation.
FIG. 3 shows a side elevation of a modified form of the applicator.
FIG. 4 shows the modified form in front elevation.

The device 10 comprises a tubular handle 11, equipped with shut-off valve 12 as shown in FIG. 1, said handle communicates with the run of inverted Y 13. The run of Y 13 is plugged at 14, but its branch 15, leads through a connection to the hose 16. The lower portion of the handle 17, which may be either a tube or a bar, extends from the Y 13, to its point of attachment 18, to the axle 19. Wheels 20 and 21 are rotatably fastened at either end of axle 19. Two braces 22 and 23, which together form an arched V, extend from positions adjacent to the ends of axle 19, to a horizontal support bar 24. When the device is in use, braces 22 and 23 extend substantially vertically upwards.

A large detachable hood 25 occupies the forward part of the machine. Hood 25, is supported on the plate brackets 26 and 27, which bear slots at their lower end to allow them to be dropped over axle 19. The upper portion of hood 25 can be retained by brace bolt 28, which passes through a small plate 29, welded between braces 22 and 23. Top 30, forms a tight, detachable cover for the hood. Side walls of the hood are shown at 31. Plate 32, which is detachably fastened to the rear wall 56, of hood 25, supports a pipe 33, which terminates inside the hood in a spray nozzle 34. The forward wall 35, of hood 25, is a substantially vertical plane surface. The floor or bottom 36, is sharply slanted from the rear wall 56, to the front and closely approaches but does not touch wall 35. Consequently a gap 37 is left between wall 35 and bottom 36. The terminal portion of wall 35, however, which lies below the gap 37, turns inwardly and terminates in the saw teeth 39.

As a consequence of this arrangement, the solution or slurry which is supplied under pressure through the hose 41, passes through the tubular handle into the hose 16, through the quick-detachable hose connection 42, and sprays out of spray nozzle 34. Spray nozzle 34 emits its spray in a thin, substantially uniform, semi-circular sheet. Since all of the spray is completely housed within the closed hood 25, all of the material flows down the steeply inclined bottom 36, and drops onto the curved nose 38, running off and dropping on the turf from the saw-toothed points of the edge 39. Edge 39 is so close to the turf that practically no material has a chance to be carried away by the wind as it falls off the saw-toothed edge 39.

The modification of this device, shown in FIGURES 3 and 4, is particularly useful when shrubs and broad-leafed vegetation crowd the grass plot and when materials which are highly toxic to such shrubs must be applied to the turf. The essential difference is that the slurry, instead of dropping freely onto the turf from the saw-toothed edge 39, of the hood 25, drops onto a roller 43, where it forms a film on the roller surface which is transferred to the turf as the roller moves over it. The parts of the device are essentially similar to those of the device shown in FIGURES 1 and 2, with the exception that the braces 46 and 47, are modified to allow them to straddle the roller.

Specifically the device is provided with a tubular handle 44, the extension 45, of which extends to a cross brace which extends between the braces 46 and 47. Supports 48—48, for the rood 49, are welded to the side members of the hood and straddle the roller 43. As before, the slurry under pressure is delivered through handle 44 and through the hose 51 to the spray nozzle 52. A quick-detachable hose connection is provided at 53 so that the hood 49, may be removed easily for cleaning and washing.

Since the incurved marginal portion of the front wall 55 of hood 49 comes close to the periphery of roller 43, and lies above the horizontal diameter of the roller, liquid, which drips from the saw-toothed margin 54, falls onto the upper forward quadrant of the periphery of the roller where it forms a uniform film. As the roller is pushed over the sod, the film rolls into contact with the grasses and consequently an exceedingly uniform application of lawn-treating materials is made. The gap between the margin 54 and roller 43 is so narrow that practically no material can be displaced by wind.

A very considerable advantage of this device lies in the fact that the spray nozzle is subjected to full pressure exerted on the slurry or solution and very rarely plugs. The distribution of lawn-treating materials, whether applied by the wheeled device of FIGURES 1 and 2, or the roller form of the apparatus shown in FIGURES 3 and 4, is accordingly very uniform and contrasts sharply with discharges from multi-orificed pipes. In the latter case, the individual orifices are frequently plugged by slurry particles. In both types of device, the area in which liquid emerging through the slot is exposed to any wind is reduced to a minimum, and the device may be safely used without hazard to surrounding vegetation.

We claim:
1. A device for applying slurries and solutions of fertilizers, weed killers and the like to turf, comprising, in combination, a wheeled frame having a tubular handle equipped with a shut-off valve, said handle communicating with the run of an inverted Y, said run being plugged at its exit, the branch of said Y communicating through a hose having a quick-detachable hose connection, with a pipe which terminates in a spray nozzle, arranged to spray fluid under pressure and detachably fastened to the rear wall of a detachable hood for confining and preventing the drift of spray; said hood comprising forward, rear, detachable top, bottom, and side walls, the forward wall having an inturned lower marginal portion terminating in a saw-tooth edge, the bottom being inclined at a sharp downward angle and having its forward margin lying in close proximity to the forward wall, the inturned margin of the forward wall projecting inwardly beyond and below the margin of the bottom wall, whereby spray from the nozzle will emerge from the hood in a multiplicity of streamlets falling from the saw-toothed margin of the hood directly onto the turf.

2. A device for applying slurries and solutions of fertilizers, weed killers and the like to turf, comprising, in combination, a frame supporting a detachable hood above a cylindrical roller, said frame having a tubular handle equipped with a shut-off valve, said handle communicating with the run of an inverted Y, said run being plugged at its exit, the branch of said Y communicating through a hose having a quick-detachable hose connection, with a pipe which terminates in a spray nozzle, arranged to spray fluid under pressure and detachably fastened to the rear wall of said detachable hood for confining and preventing the drift of spray; said hood comprising forward, rear, detachable top, bottom, and side walls, the forward wall having an inturned lower marginal portion terminating in a saw-tooth edge, the bottom being inclined at a sharp downward angle and having its forward margin lying in close proximity to the forward wall, the inturned margin of the forward wall projecting inwardly beyond and below the margin of the bottom wall, whereby spray from the nozzle will emerge from the hood in a multiplicity of streamlets dropping from the saw-toothed margin of the hood on the upper forward quadrant of the roller surface which deposits said slurries and solutions on the grass as the roller rotates.

References Cited in the file of this patent

UNITED STATES PATENTS

| | | |
|---|---|---|
| 922,664 | Burden | May 25, 1909 |
| 1,844,732 | Wilmeth | Feb. 9, 1932 |
| 2,812,211 | Gardner | Nov. 5, 1957 |
| 3,112,512 | Arrault | Dec. 3, 1963 |

FOREIGN PATENTS

| | | |
|---|---|---|
| 702,557 | Great Britain | Jan. 20, 1954 |